United States Patent [19]
Sung

[11] Patent Number: 6,110,241
[45] Date of Patent: Aug. 29, 2000

[54] ABRASIVE GRAIN WITH IMPROVED PROJECTABILITY

[75] Inventor: Jason Sung, Northborough, Mass.

[73] Assignee: Saint-Gobain Industrial Ceramics, Inc., Worcester, Mass.

[21] Appl. No.: 09/370,327

[22] Filed: Aug. 6, 1999

[51] Int. Cl.$^7$ ............................. C09C 1/68; C09K 3/14
[52] U.S. Cl. ............................. 51/308; 51/293; 51/307; 428/405; 428/404; 427/215; 427/219; 427/397.8; 427/220; 427/387; 427/402
[58] Field of Search ........................ 51/293, 308, 309, 51/307; 428/403, 404, 405; 427/213.31, 213.32, 214, 219, 215, 372.2, 397.8, 220, 387, 402

[56] References Cited

U.S. PATENT DOCUMENTS

| | | | |
|---|---|---|---|
| 2,527,044 | 10/1950 | Walton et al. | 51/308 |
| 3,902,873 | 9/1975 | Hughes | 51/309 |
| 4,278,449 | 7/1981 | Helletsberger et al. | 51/308 |
| 4,472,173 | 9/1984 | Bruning et al. | 51/308 |
| 4,666,465 | 5/1987 | Matsumoto et al. | 51/308 |
| 4,773,920 | 9/1988 | Chasman et al. | 51/293 |
| 4,913,708 | 4/1990 | Kalinowski | 51/293 |
| 4,997,461 | 3/1991 | Markhoff-Matheny et al. | 51/293 |
| 5,042,991 | 8/1991 | Kunz et al. | 51/308 |
| 5,250,084 | 10/1993 | Lansell et al. | 51/293 |
| 5,250,085 | 10/1993 | Mevissen | 51/308 |
| 5,313,742 | 5/1994 | Corcoran, Jr. et al. | 51/308 |

Primary Examiner—Michael Marcheschi
Attorney, Agent, or Firm—David Bennett

[57] ABSTRACT

Abrasive grain with increased projectability in a UP deposition process is provided with a first conductive coating and a second coating comprising a silicon-containing compound.

20 Claims, 3 Drawing Sheets

ABRASIVE GRAIN WITH IMPROVED PROJECTABILITY

BACKGROUND OF THE INVENTION

This invention relates to abrasive grain that has improved suitability in the production of coated abrasives.

Coated abrasives are frequently made by depositing on a substrate a layer of a curable binder resin formulation referred to as a "maker" coat and then subsequently depositing on the uncured or incompletely cured maker coat, abrasive grains. The grains stick to the maker coat which is then either partially or completely cured before being provided with another coat of curable resin binder, (the "size" coat), overlaying the abrasive grain. This size coat, when cured in designed to hold the abrasive grain in place when the coated abrasive is in use.

This invention relates primarily to the technique for depositing the abrasive grain on the maker coat. There are two basic approaches: the grain can either be gravity fed on to the surface of the maker coat; or it can be projected on to the same surface. The latter technique is most widely used and the projecting force is electrostatic in nature. The grain is placed on a bed or tray and the substrate with the maker coat thereon is passed over the bed with the maker coat facing downwards. An electrostatic differential is established between plates behind the substrate, (and directly over the bed), and under the bed itself. The abrasive particles become charged and are projected towards the maker coat and adhere thereto. This is often referred to as UP-deposition.

That is the theory and for many abrasive grains it is quite effective. However some abrasive grains, such as particularly alumina/zirconia abrasive grains, are very susceptible to the moisture content of the air in terms of the amount of charge they can hold and the time for which the charge can be held. It is known to treat the abrasive grains with a salt such as magnesium chloride to improve the projectability but the moisture effect is a dominant factor even then. Often if the humidity of the projection area is allowed to vary the amount of grain deposited in any operation will be different at the end from what it was at the beginning or the grain coverage will be patchy. The standard solution to this problem is to use only freshly treated grain and/or to deposit the grain within a temperature and humidity controlled environment.

The seriousness of the problem is in part dependent on the size of the grain. Clearly the larger the grain, the more charge must be retained to enable it to be successfully projected. The problem seems to reach its most serious expression with alumina/zirconia grains of 24 grit size and coarser.

The present invention provides an abrasive grain that maintains a relatively constant projectability in a range of humidity conditions. The invention also provides a method of treating abrasive grain to improve its projectability. While the invention has broad applicability, it is primarily useful with grains that are moisture susceptible such as alumina/zirconia grains.

DESCRIPTION OF THE INVENTION

The present invention provides abrasive grain with improved projectability having a first surface coating comprising a conductive material and a second surface coating over the first comprising a silicon-containing compound selected from the group consisting of silicates, organosilanes and mixtures thereof.

The conductive material which is a component of the first surface coating can be a carbon material such as carbon black or graphite or other elemental form of carbon that is conductive. To enable the carbon to adhere more readily to the abrasive grain surface, it is preferred that the carbon be applied as a slurry in an organic binder such as a polyvinyl alcohol solution. Other binders that can be used include unsaturated polyesters such polyvinyl acetate.

The second coating frequently comprises a silicate such as a metal silicate or an organic silicate that hydrolyzes readily to silicic acid. The most readily available silicate is an alkali metal silicate such as sodium silicate. This has the advantage of being readily available, dispersible in water and cheap. However an alkyl silicate such as ethyl silicate can also be used. Alternatively or additionally the silicon-containing compound can be an organosilane of the kind commonly used as an adhesion control or coupling additives. Such compounds are currently available commercially from Dow Corning Corporation as Z-6030 and from Union Carbide Corporation as A-174 and A-1100. Some of the most preferred organosilanes are aminosilanes such as A-1100

The second coating is preferably applied over the first coating before it is dried. Thus no intermediate drying stage is required.

The amount of the conductive carbon coating comprising the first layer can be anything from 0.03% of the weight of the abrasive grain and upwards, perhaps as much as 0.1% of the grain weight. Preferably however the amount used is from 0.04 to 0.08% of the abrasive grain weight.

The amount of the silicate deposited on the grain in the second coating, (measured as silica), is preferably from 0.01 to 0.5%, and more preferably from 0.02 to 0.04%, of the weight of the grain itself.

Where an organosilane is used the amount added is preferably 0.05 to 0.2%, and particularly from 0.08 to 0.15% based on the grain weight The grain itself can be any of the typical abrasive grains in use today such fused or ceramic alumina, silicon carbide and alumina/zirconia. As indicated earlier, the problem is most intense with respect to fused alumina/zirconia abrasive grains. The amount of zirconia in such a fused mixture can be anything from about 20% by weight up to the theoretical eutectic value of about 43% by weight.

DRAWINGS

DESCRIPTION OF PREFERRED EMBODIMENTS

Figure 1:
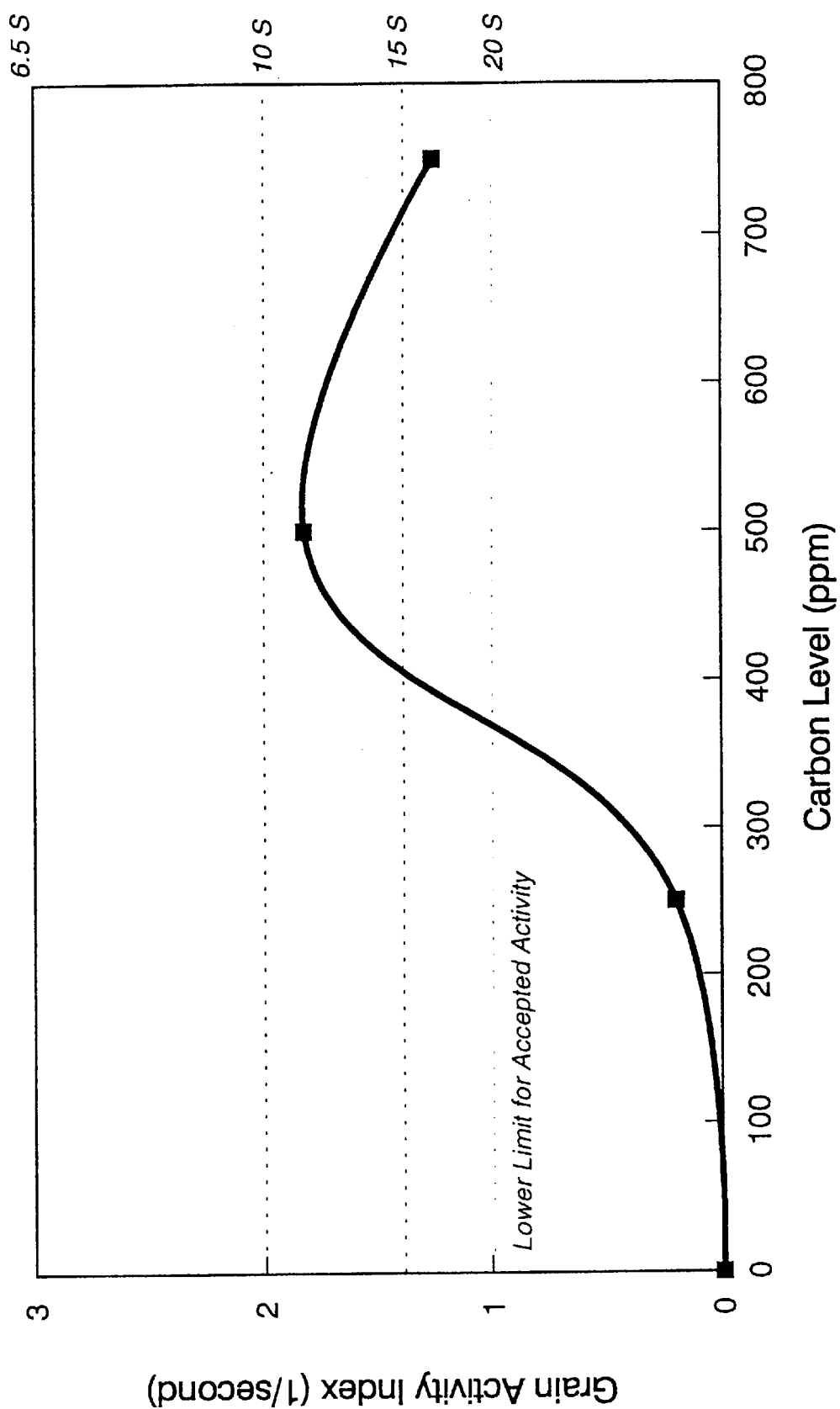
FIG. 1 shows the variation of grain activity with variation of carbon level in the first coat with a constant silicate level in the second coat.

The invention is now illustrated with reference to the following examples, which are understood to imply no necessary limitations on the scope of the invention.

In the Examples the carbon component of the first layer is carbon black powder and the exemplar chosen is sold under the trade name of "Vulcan-XC72R" by Cabot Corporation. The Abrasive grain chosen was a 24 grit alumina/zirconia sold by Norton Company under the registered trademark "NORZON" NZP.

EXAMPLE 1

A 7.5 wt % aqueous solution of polyvinyl alcohol was mixed with carbon black to produce a material to provide the first coat. The amount of abrasive grain treated was 454 gm and the first coat material comprised 3.5 gm of a 7.5% solution of polyvinyl alcohol, 0.8 gm of water and 0.23 gm of carbon black. The mixture was poured onto the grain and mixed in a blender to provide an even coat over the surface of the grain.

The coated grain was then treated with a solution containing 0.40 wt % of sodium silicate. This was poured into the blender before the first coat had dried. Drying was only initiated after the second coating had been completed. This was done at 100° C. overnight.

The "Grain Activity Index" was then calculated. This index is defined as the reciprocal of the "Grain Activity" multiplied by 20. "Grain Activity" is the number of seconds taken for a fixed amount of grain to be projected over a fixed distance under a fixed charge differential. It is therefore primarily useful as a comparative tool to show projectability variation with varying conditions. It is measured by placing a known weight of grain on one plate of a pair of opposed plates maintained at a standard separation and adapted to be charged with a voltage differential between the two at a fixed level, (in this case 14.5 volts). The weight of the grain on the surface of the plate was measured on a continuous basis and the charge differential across the plates was established. The time for all but two grams of the grain to be projected across the gap was measured. A projection time, (the Grain Activity), for this particular test below 20 seconds is considered acceptable.

The Grain Activity Index was measured at approximately 1.9 and the minimum value acceptable is about 0.9. The double coating of the invention is therefore extremely effective in providing a grain that can be projected in an UP coating operation.

As an extension of this study, a series of experiments were conducted in which first of all the carbon black content of the first layer was held constant and the amount of sodium silicate in the second layer was varied. The results are tabulated in the graph presented as FIG. 1.

Figure 2:
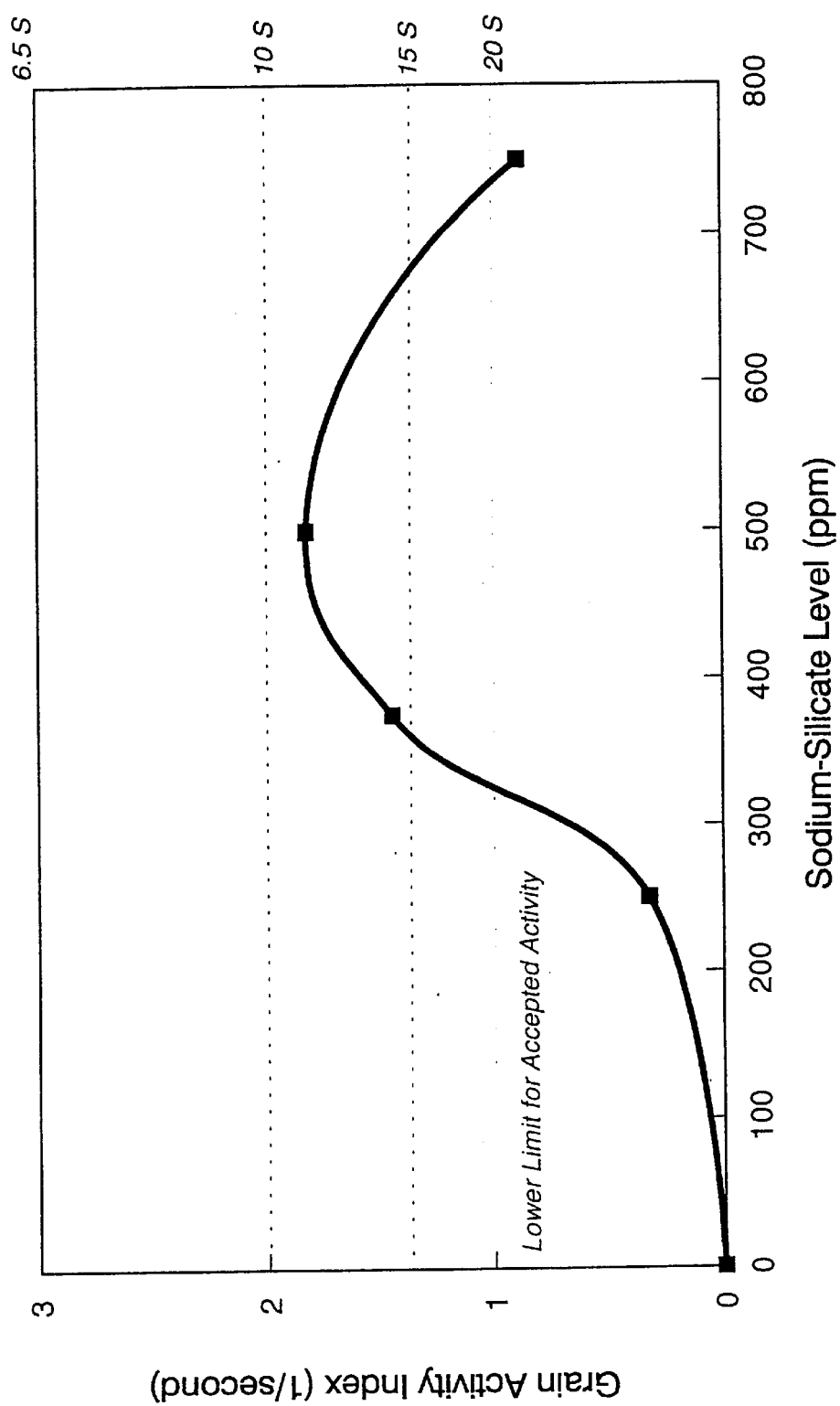
FIG. 2 shows the variation of grain activity with variation of the silicate level in the second coat with a constant level of carbon in the first coat.

The result of varying the amount of carbon black in the first layer was varied while the amount of sodium silicate in the second coat was held constant. The results are presented in the graph appearing as FIG. 2. Taken together the graphs indicate that optimum levels of carbon black and sodium silicate occur at about 500 ppm. This corresponds to 0.05 wt % of carbon and 0.05 wt % of sodium silicate, (or about 0.025% measured as silica).

EXAMPLE 2

In this Example the grain activity obtained with a) the same sodium silicate second coating as was used in Example 1 and b) with a 0.1% coating, based on the grain weight, of an aminosilane, ("A-1100"), second coating. In each case the first coating was exactly as described in Example 1 and the method of testing for activity was also the same.

Figure 3:
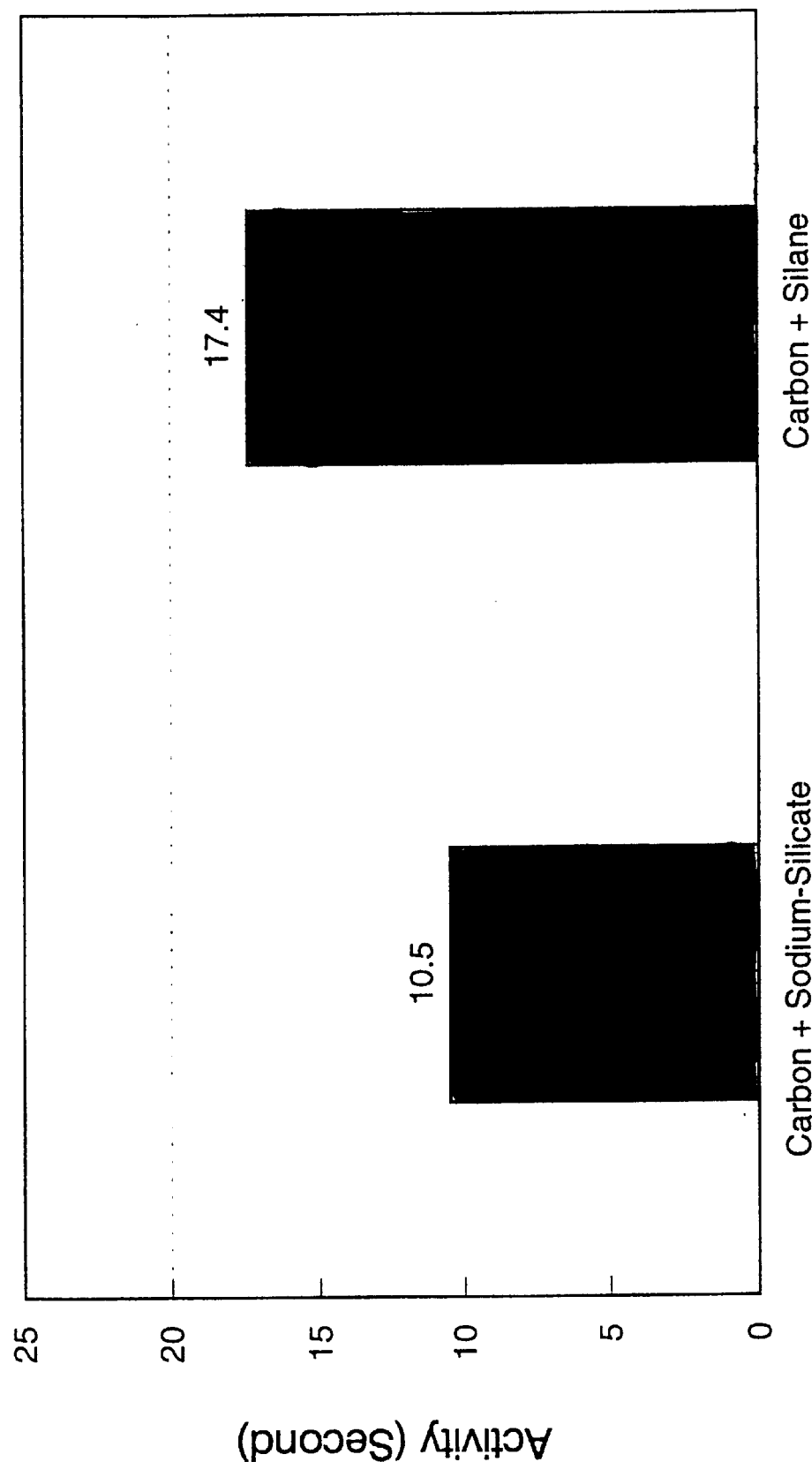
FIG. 3 is a bar graph showing the grain activity with a silicate second coating and with an organosilane second coating.

The bar graph presented as FIG. 3 shows that although not quite so effective as the silicate, the aminosilane achieved satisfactory levels of projectability for the coated grain. In addition it afforded increased grinding performance, presumably as a result of the better adhesion between the bond and the grain that this additive promoted.

What is claimed is:

1. Abrasive grain with improved projectability for production of coated abrasives having a first surface coating on the grain comprising a conductive material and a second surface coating over the first comprising a silicon-containing compound selected from the group consisting of silicates, aminosilanes and mixtures thereof.

2. Abrasive grain according to claim 1 in which the conductive material in the first surface coating is selected from the group consisting of carbon black and graphite.

3. Abrasive grain according to claim 1 in which the amount of conductive material deposited on the surface of the grain represents at most 0.1% of the grain weight.

4. Abrasive grain according to claim 1 in which the amount of conductive material deposited on the surface of the grain represents from 0.04 to 0.08% of the grain weight.

5. Abrasive grain according to claim 1 in which the second surface coating comprises an alkali metal silicate.

6. Abrasive grain according to claim 1 in which the second coating comprises a silicate in an amount, (measured as silica), of from 0.01 to 0.5% of the grain weight.

7. Abrasive grain according to claim 1 in which the second coating comprises a silicate in an amount, (measured as silica), of from 0.02 to 0.04% of the grain weight.

8. Abrasive grain according to claim 1 in which the second coating comprises an aminosilane.

9. Abrasive grain according to claim 8 in which the second coating is present in an amount of from 0.05 to 0.2% of the grain weight.

10. Abrasive grain according to claim 1 in which the grain is a fused alumina/zirconia.

11. Abrasive grain according to claim 1 in which the abrasive grain is of grit size 24 or coarser.

12. A process for the production of abrasive grain with improved projectability for production of coated abrasives which comprises:

a) providing an abrasive grain selected from the group consisting of alumina and fused alumina/zirconia;

b) applying a first surface coating to said grain comprising a conductive material dispersed in a carrier;

c) applying a second coating over the first surface coating which second coating comprises a silicon-containing compound selected from the group consisting of silicates, organosilanes and mixtures thereof; and d) drying the coated grain.

13. A process according to claim 12 in which the first coating is not dried before application of the second.

14. A process according to claim 12 in which the carrier for the first coating is a hydrophilic polymeric liquid.

15. A process according to claim 12 in which the carrier is polyvinyl alcohol and the conductive material is carbon black.

16. A process according to claim 12 in which the second coating is applied as an aqueous solution of sodium silicate.

17. A process according to claim 12 in which the second coating comprises an organosilane.

18. A process according to claim 12 in which the first coating is applied in an amount sufficient to deposit from 0.04 to 0.08% by weight, based on the grain weight, of the conductive material.

19. A process according to claim 16 in which the amount of the second coating applied is sufficient to deposit from 0.02 to 0.04%, based on the grain weight, of the silicate, (measured as silica).

20. A process according to claim 17 in which the amount of the second coating applied is sufficient to deposit from 0.05 to 0.2%, based on the grain weight, of an organosilane.

* * * * *